June 10, 1930. W. S. STOCKTON 1,762,842
VEHICLE BRAKE
Filed May 24, 1928 3 Sheets-Sheet 1
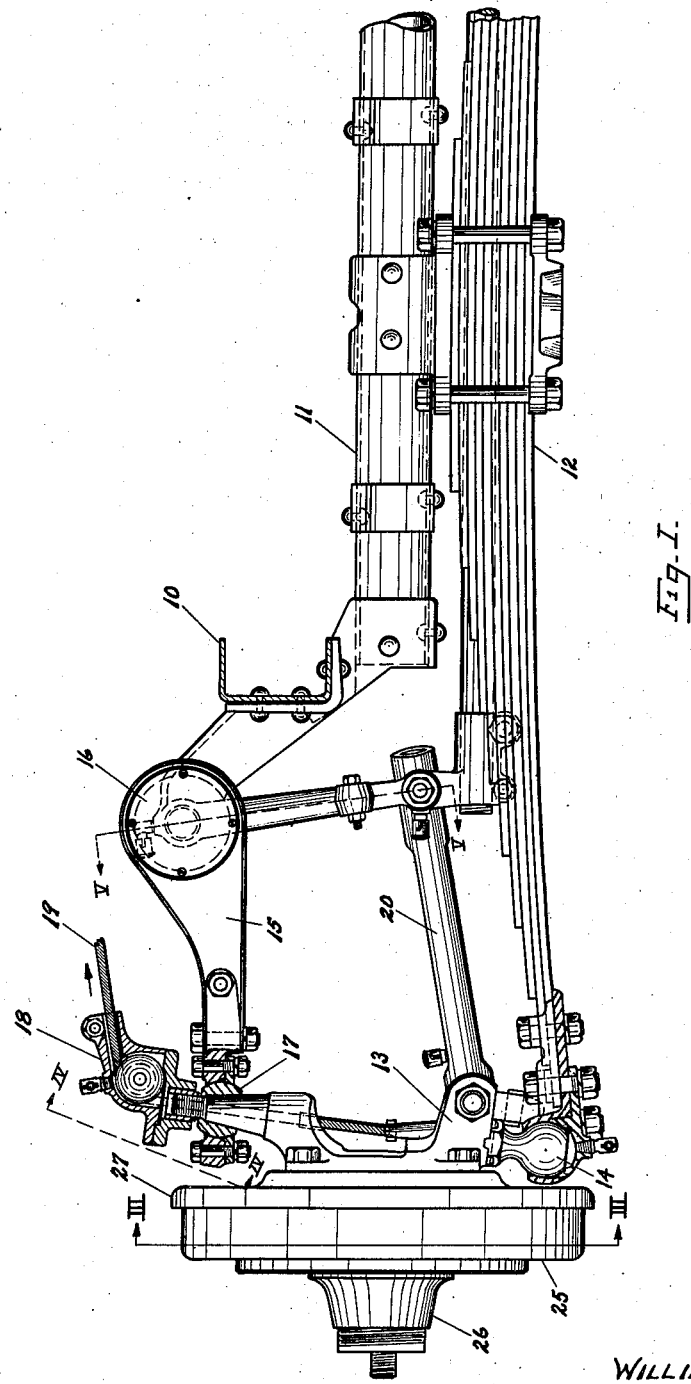
Fig.I.
INVENTOR.
WILLIAM S. STOCKTON
BY
Warren T. Hunt
ATTORNEY.

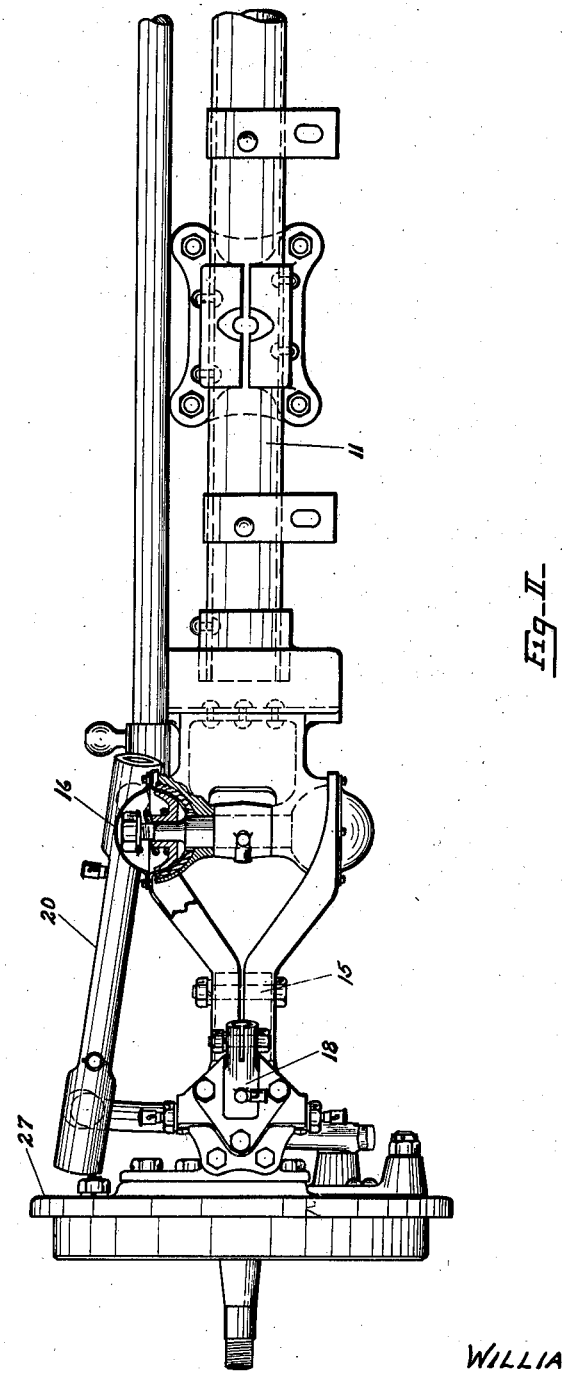

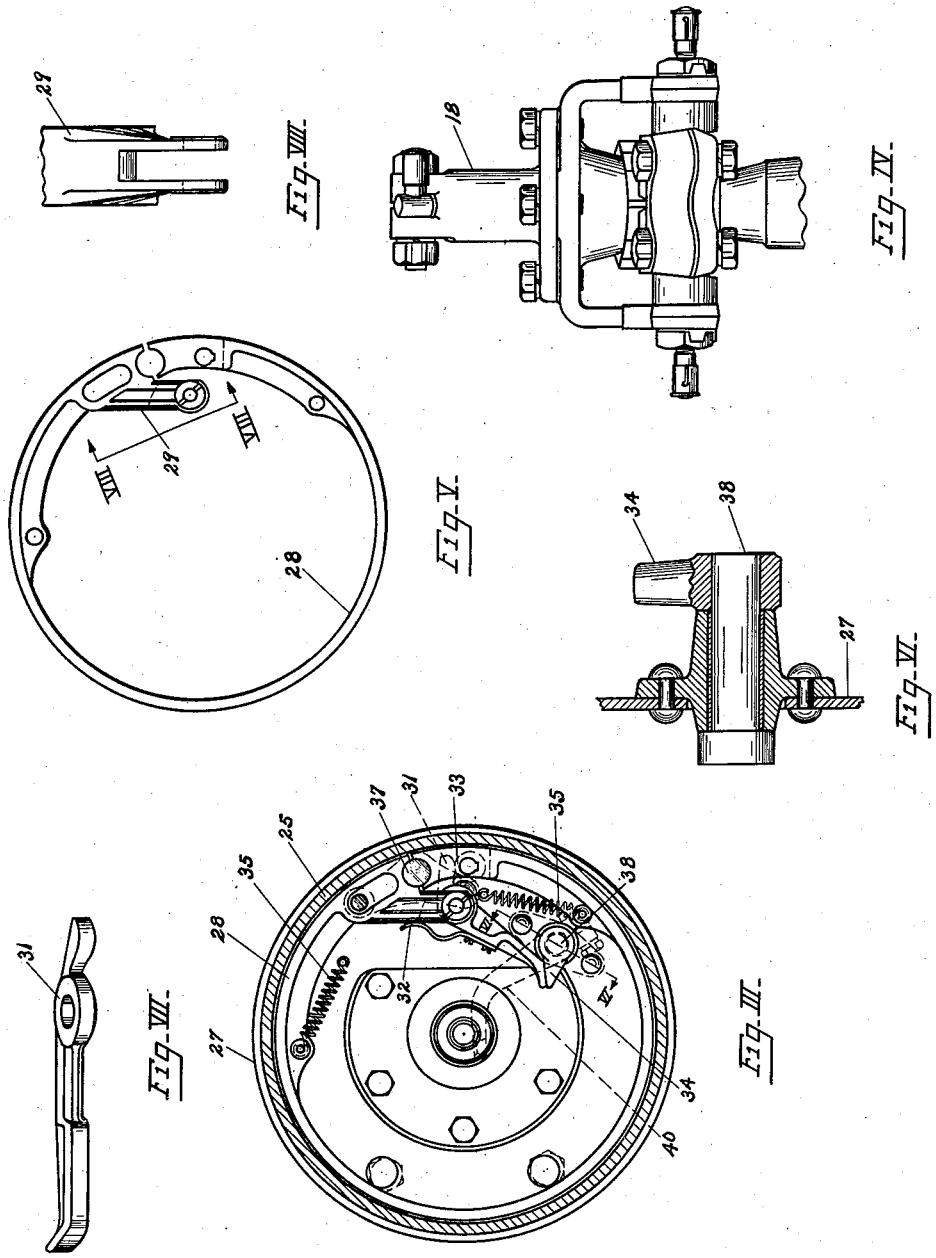

Patented June 10, 1930

1,762,842

UNITED STATES PATENT OFFICE

WILLIAM S. STOCKTON, OF TOLEDO, OHIO, ASSIGNOR TO THE WILLYS-OVERLAND COMPANY, OF TOLEDO, OHIO, A CORPORATION OF OHIO

VEHICLE BRAKE

Application filed May 24, 1928. Serial No. 280,172.

My invention relates to vehicle brakes and it has particular application to brakes of the internal expanding type.

The present invention deals with internal brakes for automobiles and is peculiarly adapted for application to wheels which support the weight of the chassis through a direct spring suspension, that is, without the conventional rigid front axle, the spring suspension being intended to permit relatively vertical movement of the two front wheels.

The invention is not limited, however, to the spring suspension type but may be applied to vehicles embodying a rigid front axle. Since the front wheels must be free to permit of steering the vehicle and since the wheels may be moved vertically independently of each other, it is essential that the brake connections function under these various conditions.

One object of this invention is to provide a compact brake expanding mechanism which will allow for the diversified movements of the wheels without impairing its efficiency as a brake.

In line with the former object, the present invention contemplates the provision of a structure wherein the brake expanding mechanism is actuated in a plane which is in vertical alignment with the axis of the drum as well as adjacent the axis of the wheel.

Another object of the invention is to provide a combination of levers and cams which is compact and yet, which will give a suitable mechanical advantage for brake purposes.

An additional object of the invention is to provide a compact resilient means for returning the actuating mechanism to its normal released position.

These, together with other objects of the invention will become more apparent upon consideration of the drawings and description relating thereto, which set forth one embodiment of my invention which may be preferred.

Figure I is an elevational view illustrating the spring suspension, together with the means for actuating the brake.

Fig. II is a plan view of the structure illustrated in Figure I.

Fig. III is an elevational view taken along the line III—III of Fig. I and illustrates the details of the brake expanding mechanism.

Fig. IV is a view of the cable guide, taken along the line IV—IV in Fig. I.

Fig. V is a detail view of the expanding band.

Fig. VI is a sectional view of the cam actuating means, taken along the line VI—VI in Figure III.

Fig. VII is a perspective view of the band expanding lever; and

Fig. VIII is an end view of the expanding band lug taken along the line VIII—VIII of Figure V.

Inasmuch as the details of construction of leaf spring axles are well known in the art, only those elements having a bearing upon the present invention will be referred to in the course of the description. It is to be borne in mind, however, that the invention is not limited to any particular type of axle, although it may well be adapted to such an embodiment.

In practising my invention I provide a vehicle frame including longitudinal and transverse members, 10 and 11 respectively, from which there is suspended a transverse leaf spring 12 and the mass of the vehicle and spring in turn, is suspended from the steering knuckle 13 through a ball socket joint 14. A substantially vertical alignment of the knuckle is maintained by means of an arm 15, one end of which is joined to the frame by a pressed steel ball and socket joint 16 that permits of movement in a vertical plane; whereas movement in a horizontal plane is provided by a joint 17 at the other end of the arm which joins the steering knuckle. The upper end of the knuckle is hollow and includes a right-angle guide 18 through which a cable 19 extends that interconnects the brake pedal mechanism (not shown) with the brake expanding elements, hereinafter to be described.

Since the steering knuckle 13 is freely supported by a ball and socket joint 14 at its base and ball and socket joint 17 at its upper extremity, it is apparent that the wheel may be pivoted about horizontal and vertical axes. The steering movement is accomplished through a series of steering connecting rods 20 in a manner well understood by those skilled in the art.

A hollow drum 25 which is secured integrally with a wheel structure 26, the hub portion alone being illustrated, rotates with the wheel. The open face of the drum is adjacent a plate 27 that is bolted to the steering knuckle 13, forming a closed chamber with the drum. An expandible brake band 28 is disposed within the chamber and engages the periphery of the drum. It includes an inwardly projected bifurcated lug 29 and a plurality of slots and apertures. Within the bifurcated lug a brake band expanding lever 31 is pivotally supported intermediate its extremities, its normal released position being maintained by means of a spring 32 which is secured to the lever and slidably engages the lug 29. One end of the lever contacts a bearing surface 33 which forms one extremity of the band, whereas the other end of the lever engages and is actuated by a cam 34. Two coil springs urge the brake band into a released position, one end of each being secured to the plate, whereas the other is secured to the brake band. Adjacent the bifurcated lug, a pin 37 is rigidly anchored to the plate which functions to resist the tendency by the band to rotate upon application of the brake band to the rotating drum and thereby prevents the transmission of forces back through the train of elements by which the brake is energized.

A stub shaft 38 is pivotally mounted in the plate. The cam member 34 is keyed to this shaft on one side of the plate, whereas on the other side thereof a cable actuating arm 40 is rigidly secured thereto. It will be noted that the free extremity of the cable arm terminates substantially in alignment with the drum axis. Furthermore as the arm is pivoted upwardly the vertical alignment is substantially maintained. One end of the cable 19, which passes through the right-angle guide referred to above, is secured to the free end of the cable arm, the other end of the cable extending to the brake pedal (not shown).

In applying the brakes, the cable 19 is drawn in the direction indicated by the arrow in Figure 1, by a foot pedal, for example, whereby the cable arm 40 is actuated upwardly and causes the cam to rotate in the same direction. One arm of the brake expanding lever 31 being in engagement with the arm, movement of the cam in the course of the application of the brake rotates the lever in a clockwise direction about its pivotal point. The motion thus imparted to the lever tends to spread the brake band thereby bringing it firmly against the periphery of the drum. Such movement also subjects the spring 32 to a strain which, upon release of the brake, will tend to rotate the lever in a counter-clockwise direction and return the same to its normal released position. The band is likewise returned to its normal released position by the coil spring 35. Since the extent of the movement of the cable arm is restricted, its free end remains adjacent the axis of the drum whereby movement of the wheel about this vertical axis is possible without impairing the effectiveness of the brake. For the same reason, any vertical movement of the wheel produced by the irregularities of the highway and resulting in the flexure of the spring, does not interfere with the operation of the brake.

The arrangement of the cam and levers is such as to produce any desired mechanical advantage without redesigning the entire brake. Moreover, the construction affords an efficient compact arrangement that is susceptible to adjustment and change without materially altering its arrangement or design.

Although the invention has been described as it applies to a vehicle having a flexible front axle, it will be apparent to those skilled in the art that the invention is not so limited but may be extended to other embodiments without departing from the spirit thereof and I desire, therefore, that it be limited only as indicated in the appended claims.

I claim:

1. The combination with a dirigible wheel having a substantially vertical axis of a brake drum, an expandible brake band disposed within the drum, a supporting plate disposed adjacent the drum in spaced relation to the axis, adapted to oscillate about said axis and forming an enclosed chamber with the drum, a band expanding lever pivotally secured to one end of the brake band and engageable with the other end of the brake band, a cam pivotally mounted in the plate, adapted to engage the lever an arm operatively connected to the cam and adapted to actuate said cam, said arm having a portion thereof projecting toward said axis, and a cable in alignment with the axis operatively connected to the arm portion.

2. In an internal brake including a drum, an expanding means for engaging the drum, a stationary plate adjacent the drum and forming an enclosed chamber therewith, a pivotable lever supported intermediate its extremities on one end of the band, one end of the lever being engageable with the opposite end of the band, a cam pivotally mounted in the plate adapted to engage and actuate the opposite extremity of the lever, a leaf spring to secure the lever adapted to urge said lever into a released position, and means secured to the cam for oscillating same.

3. In an internal brake including a drum, an expanding means for engaging the drum, a stationary plate adjacent the drum and forming an enclosed chamber therewith, a pivotable lever supported intermediate its extremities secured to one end of the band one end of the lever being engageable with the opposite end of the band, a shaft pivotally supported in the plate a cam secured thereto adapted to engage the opposite extremity of the band and actuate the same and a cable arm likewise secured to the shaft for imparting oscillatory motion thereto the free end of said cable arm being substantially in vertical alignment with the axis of the drum.

4. In an internal brake, including a drum, an expanding means for engaging the drum, a lever pivotally supported intermediate its extremities, one end thereof being adapted to actuate the expanding means, a cam disposed adjacent the lever for engaging the other end thereof, and a lever secured to the cam, adapted to oscillate the same, the free end of said lever being substantially in alignment with the axis of the drum.

In testimony whereof, I affix my signature.

WILLIAM S. STOCKTON.